United States Patent
Suzuki

(10) Patent No.: US 6,735,177 B1
(45) Date of Patent: May 11, 2004

(54) MULTICAST COMMUNICATION DEVICE AND METHOD

(75) Inventor: Mitsutaka Suzuki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/440,956

(22) Filed: Nov. 16, 1999

(30) Foreign Application Priority Data

Nov. 18, 1998 (JP) ............................................. 10-327842

(51) Int. Cl.$^7$ ................................................ H04L 12/56
(52) U.S. Cl. ...................................... 370/238; 370/390
(58) Field of Search ................................ 370/390, 392, 370/238

(56) References Cited

U.S. PATENT DOCUMENTS

| | | | | |
|---|---|---|---|---|
| 4,740,954 A | * | 4/1988 | Cotton et al. | 370/408 |
| 5,671,222 A | * | 9/1997 | Chen et al. | 370/388 |
| 5,831,975 A | * | 11/1998 | Chen et al. | 370/256 |
| 6,353,596 B1 | * | 3/2002 | Grossglauser et al. | 370/256 |
| 6,484,209 B1 | * | 11/2002 | Momirov | 709/238 |

FOREIGN PATENT DOCUMENTS

| | | |
|---|---|---|
| JP | 58-111551 | 7/1983 |
| JP | 61-148941 | 7/1986 |
| JP | 4-144338 | 5/1992 |
| JP | 5-30105 | 2/1993 |
| JP | 8-256177 | 10/1996 |

OTHER PUBLICATIONS

Japanese Office Action issued Nov. 2, 2000 in a related application with English translation of relevant portions.

* cited by examiner

*Primary Examiner*—Min Jung
(74) *Attorney, Agent, or Firm*—Dickstein, Shapiro, Morin & Oshinsky, L.L.P.

(57) ABSTRACT

In a multicast communication network, each of the nodes stores a table containing distances between each of the multicast communication nodes and the other multicast communication nodes. When receiving a destination list, the node sequentially selects a node having a shortest distance from the destination list by referring to the table to generate a multicast route. Communication is made through the multicast route.

7 Claims, 10 Drawing Sheets

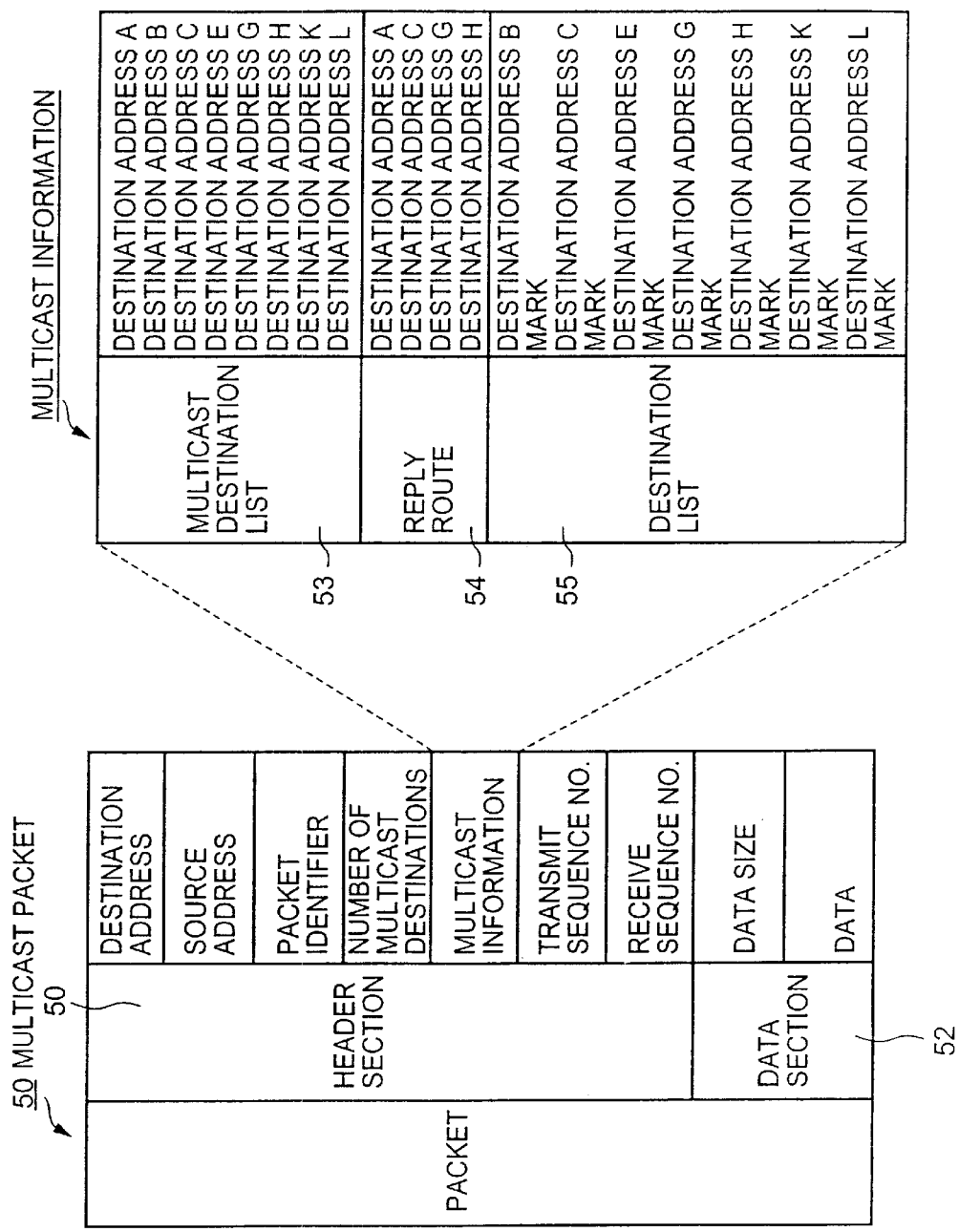

FIG.3A

60 DISTANCE MEASUREMENT REQUEST PACKET

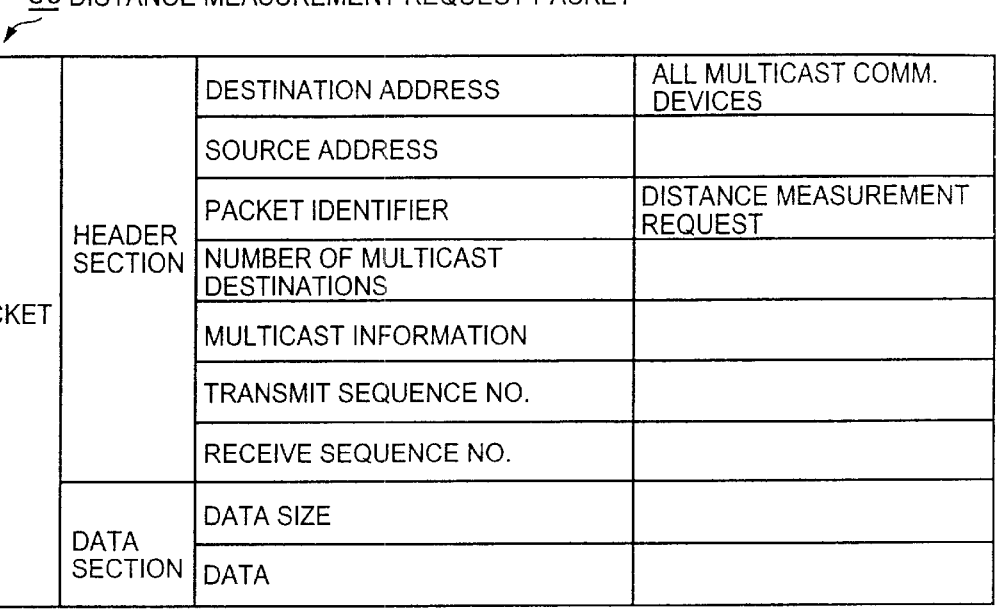

| PACKET | HEADER SECTION | DESTINATION ADDRESS | ALL MULTICAST COMM. DEVICES |
|---|---|---|---|
| | | SOURCE ADDRESS | |
| | | PACKET IDENTIFIER | DISTANCE MEASUREMENT REQUEST |
| | | NUMBER OF MULTICAST DESTINATIONS | |
| | | MULTICAST INFORMATION | |
| | | TRANSMIT SEQUENCE NO. | |
| | | RECEIVE SEQUENCE NO. | |
| | DATA SECTION | DATA SIZE | |
| | | DATA | |

FIG.3B

61 DISTANCE MEASUREMENT REPLY PACKET

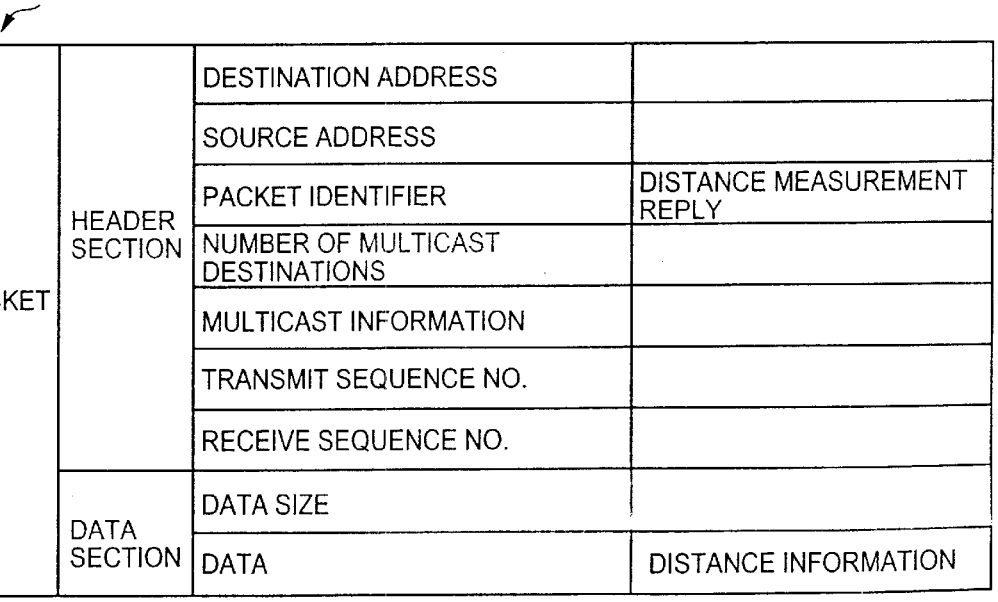

| PACKET | HEADER SECTION | DESTINATION ADDRESS | |
|---|---|---|---|
| | | SOURCE ADDRESS | |
| | | PACKET IDENTIFIER | DISTANCE MEASUREMENT REPLY |
| | | NUMBER OF MULTICAST DESTINATIONS | |
| | | MULTICAST INFORMATION | |
| | | TRANSMIT SEQUENCE NO. | |
| | | RECEIVE SEQUENCE NO. | |
| | DATA SECTION | DATA SIZE | |
| | | DATA | DISTANCE INFORMATION |

FIG.5A
DISTANCE TABLE A

| 0 | 1 | 2 | 3 | 4 |
|---|---|---|---|---|
| A | BCD | EFGH | IKL | J |

FIG.5B
DISTANCE TABLE B

| 0 | 1 | 2 | 3 | 4 |
|---|---|---|---|---|
| B | ACE | IFGH | JKL | |

FIG.5C
DISTANCE TABLE C

| 0 | 1 | 2 | 3 | 4 |
|---|---|---|---|---|
| C | ABDEFGI | HJKL | | |

FIG.5D
DISTANCE TABLE D

| 0 | 1 | 2 | 3 | 4 |
|---|---|---|---|---|
| D | ACH | BEFGIL | JK | |

FIG.5E
DISTANCE TABLE E

| 0 | 1 | 2 | 3 | 4 |
|---|---|---|---|---|
| E | BCI | ADFGJ | HK | L |

FIG.5F
DISTANCE TABLE F

| 0 | 1 | 2 | 3 | 4 |
|---|---|---|---|---|
| F | CGIJK | ABDEHL | | |

FIG.5G
DISTANCE TABLE G

| 0 | 1 | 2 | 3 | 4 |
|---|---|---|---|---|
| G | CFHKL | ABDEIJ | | |

FIG.5H
DISTANCE TABLE H

| 0 | 1 | 2 | 3 | 4 |
|---|---|---|---|---|
| H | DGL | ACFK | BEIJ | |

FIG.5I
DISTANCE TABLE I

| 0 | 1 | 2 | 3 | 4 |
|---|---|---|---|---|
| I | CEFJ | ABDGK | HL | |

FIG.5J
DISTANCE TABLE J

| 0 | 1 | 2 | 3 | 4 |
|---|---|---|---|---|
| J | FIK | CEGL | ABDH | |

FIG.5K
DISTANCE TABLE K

| 0 | 1 | 2 | 3 | 4 |
|---|---|---|---|---|
| K | FGJL | CHI | ABE | |

FIG.5L
DISTANCE TABLE L

| 0 | 1 | 2 | 3 | 4 |
|---|---|---|---|---|
| L | GHK | CDFJ | ABEI | |

| DESTINATION LIST (DESTINATION A  DESTINATION B  DESTINATION C · · · ·) |
|---|

| GROUPED DESTINATION LIST | DESTINATION A (DESTINATION D  DESTINATION E · · · ·)<br>DESTINATION B (DESTINATION C  DESTINATION F · · · ·)<br>DESTINATION G (DESTINATION H) |
|---|---|

MULTICAST COMMUNICATION DEVICE AND METHOD

BACKGROUND OF THE INVENTION

1. Field of the Invention

The present invention relates to a network system composed of a plurality of nodes and, particularly, to a system and method for multicast communication between a source node and a plurality of destination nodes.

2. Description of the Prior Art

In a multicast network, blocks of information such as packets are multicast from a source node to a plurality of destination nodes. As a multicast scheme, a multiple access multicast scheme and a transit multicast scheme are known. According to the multiple access multicast scheme, the source node sequentially communicates with the destination nodes to repeatedly transmit the same packet to the destination nodes. According to the transit multicast scheme, the packets are transferred from the source node to one of the destination nodes and then are successively transferred to the other destination nodes.

As a conventional transit multicast scheme, Japanese Patent Application Laid-Open No. 8-256177 discloses a mail multicast method and a conventional routing scheme by which mails are multicast to the plural destinations through switch stations as transit switch stations.

However, the conventional transit multicast scheme cannot provide sufficiently efficient multicast transmission, especially when a failure occurs on the multicast route.

SUMMARY OF THE INVENTION

An object of the present invention is to provide a multicast communication method and device which can provide efficient multicast services.

Another object of the present invention is to provide a multicast communication method and device which can change a multicast route rapidly and flexibly even in the case of the occurrence of a failure.

According to the present invention, in a multicast communication method from a source node to a plurality of destination nodes through at least one node in a multicast communication network, each of the nodes performs the steps of a) storing a table containing distances between each of the multicast communication nodes and the other multicast communication nodes; b) when receiving a destination list, sequentially selecting a node having a shortest distance from the destination list by referring to the table to generate a multicast route; and c) performing communication through the multicast route.

Preferably, the table in the step a) may be updated by the steps of: transmitting a distance measurement request to the other nodes in the multicast communication network at predetermined intervals; measuring response time required from transmission of the distance measurement request to reception of a distance measurement reply for each of the other nodes; and updating the table using the response time.

The step b) may comprise the steps of: b-1) selecting at least one first node having a shortest distance from the destination list by referring to a distance table of the node to produce a new destination list; b-2) grouping the nodes other than the new destination list under each first node of the new destination list; and b-3) transmitting a group of nodes for each first node as a destination list to a corresponding first node.

The step b-2) may comprise the steps of: b-2.1) sequentially selecting a single node from the new destination list; and b-2.2) sequentially selecting at least one second node having a shortest distance from the nodes other than the new destination list by referring to a distance table of the single node selected to produce a group of nodes for the single node selected.

Further preferably, groups corresponding to nodes included in the new destination list are rearranged such that a number of nodes for each group is made uniform. Each of the nodes, when receiving multicast information addressed thereto, preferably transmits an acknowledgement thereof back to the source node.

As described above, the multicast processing can be distributed among the nodes involved in the multicast route, resulting in reduced burden upon a source node. Further, since a plurality of nodes at the shortest distance can be selected as a next-hop node for multicast by referring to a distance table, the network can be efficiently used.

Furthermore, since each node can determine a multicast route using a distance table, the multicast route can be dynamically and easily changed by updating the distance table depending on where a failure occurs or a change in network configuration, resulting in more efficient multicast communication.

BRIEF DESCRIPTION OF THE DRAWINGS

FIG. 2 is a diagram showing an example of a multicast packet format used in the embodiment;

FIG. 3A is a diagram showing a format of a request packet for distance measurement used in the embodiment;

FIG. 3B is a diagram showing a format of a reply packet to the request packet used in the embodiment;

FIGS. 5A–5L are diagrams showing distance tables provided in network nodes, respectively;

DESCRIPTION OF THE PREFERRED EMBODIMENTS

Figure 1:
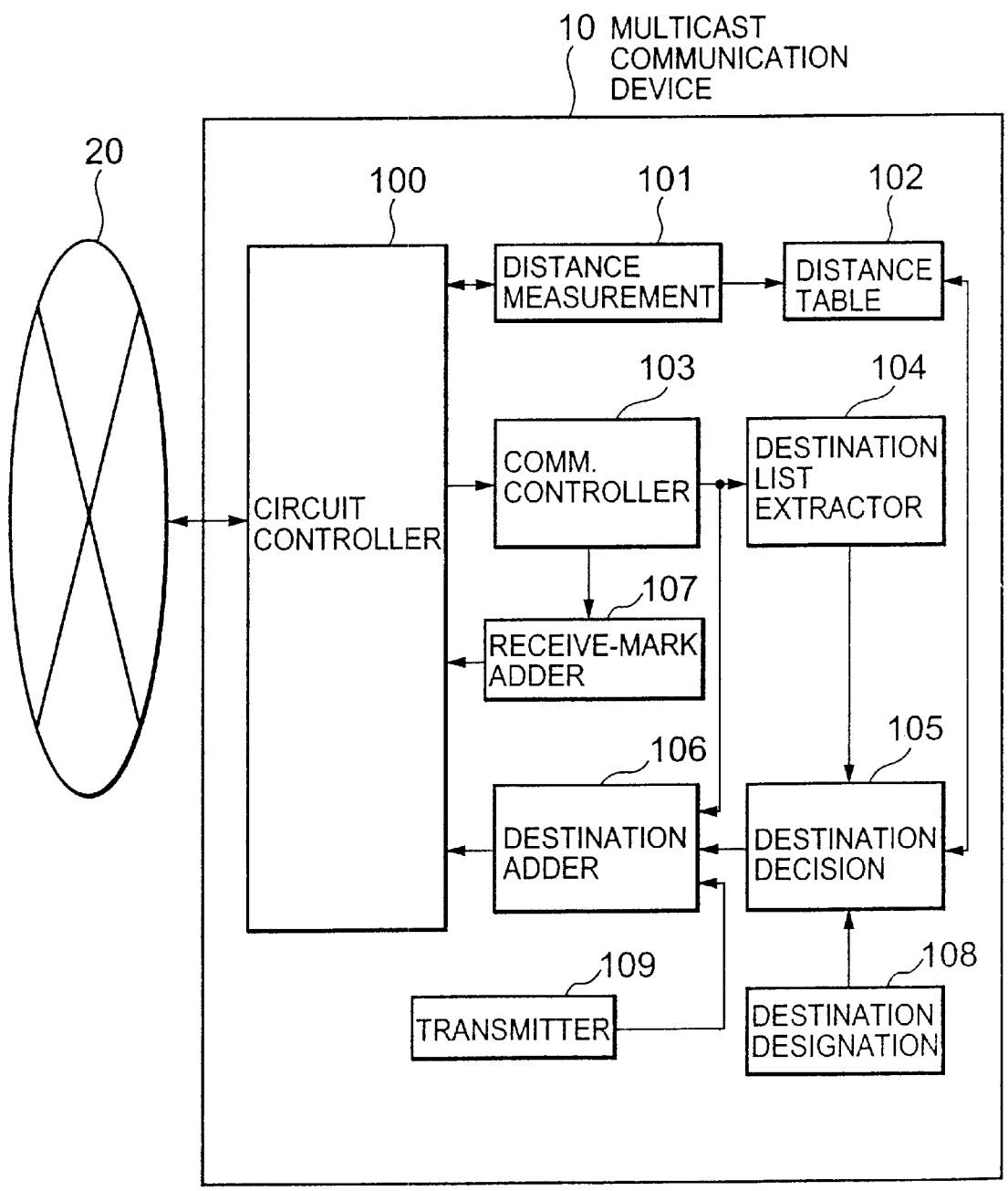
FIG. 1 is a schematic block diagram showing an internal configuration of a multicast communication device according to an embodiment of the present invention.

Referring to FIG. 1, a digital network 20 is composed of a plurality of nodes each including a multicast communication function that is implemented with a multicast communication device 10 as shown in FIG. 1.

The multicast communication device 10 has a circuit controller 100 connected to the network 20 for multicast packet transmission and reception. The multicast communication device 10 is provided with a distance measurement section 101 and a distance table 102. The distance table 102 stores distance information for each multicast destination in a predetermined form. As described later, a distance from a node to another node is defined by response time. The distance measurement section 101 performs a distance measurement operation such that a distance measurement request packet is transmitted at predetermined intervals and the distance table 102 is formed or updated depending on reception of a distance measurement replay packet.

Further, the multicast communication device 10 includes a communication controller 103, a destination list extractor 104, a destination decision section 105, a destination adder 106 and a receive-mark adder 107. The communication controller 103 extracts a header from a received multicast packet and transfers the header to the destination list extractor 104. The destination list extractor 104 extracts a multicast destination list from the header and informs the destination decision section 105 of the multicast destination list. The destination decision section 105 determines the destination address of a node at the shortest distance among the multicast destination list by referring to the distance table 102, which will be described in detail later.

The destination adder 106 inputs the received multicast packet from the communication controller 103 and adds the determined destination address to the received multicast packet to be transmitted. Under control of the communication controller 103, the receive-mark adder 107 adds the receive mark to the received multicast packet to indicate that the reception is completed.

Furthermore, a destination designation section 108 and a transmitter 109 are activated when the multicast communication device 10 becomes a source of multicast. The destination designation section 108 creates a destination list for multicast and outputs it to the destination decision section 105. The transmitter 109 assembles multicast packets from transmission data and outputs it to the destination adder 106.

Referring to FIG. 2, a multicast packet 50 for use in the multicast communication device 10 consists of a header section 51 and a data section 52. The header section 51 consists of destination address field, source address field, packet identifier field, multicast destination count field, multicast information field, transmit sequence number field, and receive sequence number field. The packet identifier is used to identify the type of the packet. The transmit sequence number and the receive sequence number are used to identify data having the same destinations. The data section 52 consists of a data size field and a data field. Further, the multicast information consists of a multicast destination list field 53, a reply route field 54, and a destination list field 55.

Referring to FIG. 3A, a distance measurement request packet 60 has the destination address field set to "all multicast communication devices" and has the packet identifier field set to "distance measurement request".

Referring to FIG. 3B, a distance measurement reply packet 61 has the packet identifier field set to "distance measurement reply" and the data field storing distance information. The multicast communication device which has received the distance measurement request packet 60 from another multicast communication device transmits the distance measurement reply packet 61 back to the other multicast communication device. The distance measurement reply packet 61 may convey the distance information stored in the distance table of the other multicast communication device.

Distance Table

The distance table 102 stores distance information for each multicast destination. More specifically, each node has a distance table containing distance information such that all the destination nodes are arranged with respect to a distance from that node. For simplicity, it is assumed the following network as shown in FIG. 4.

Figure 4:
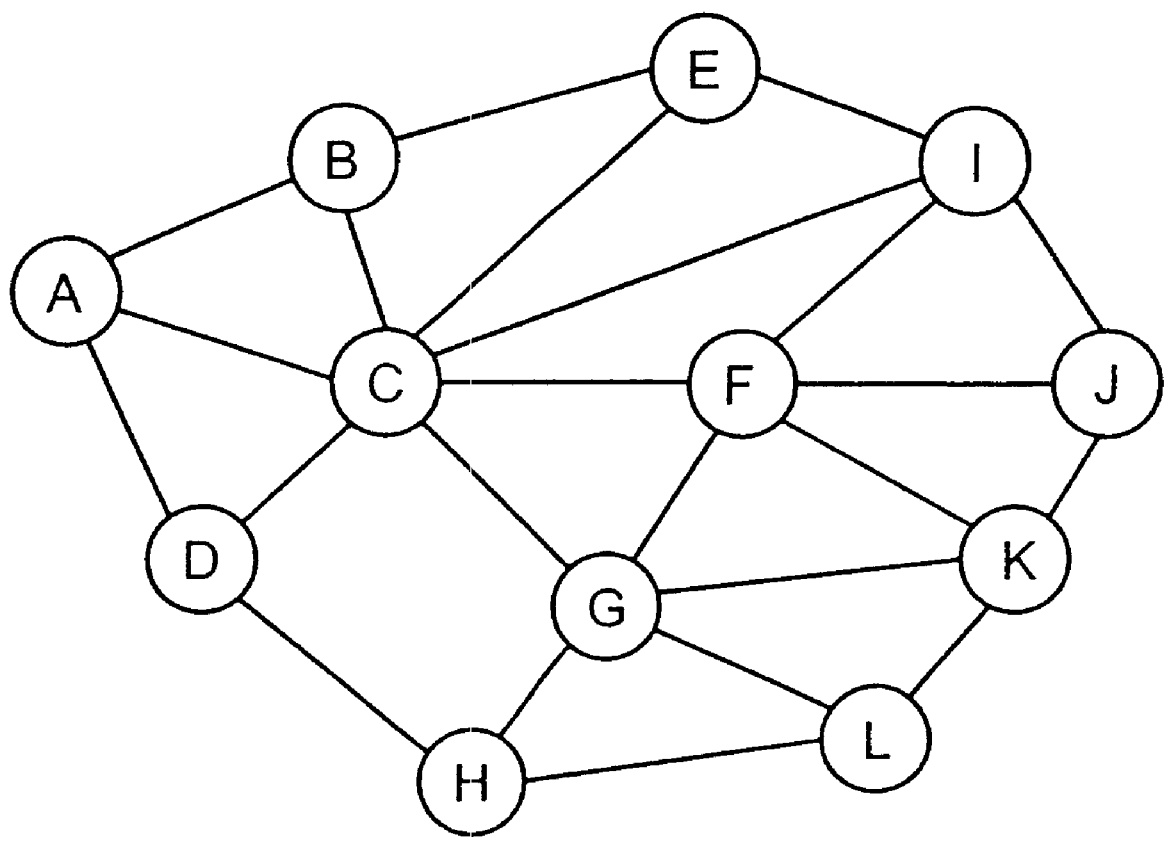
FIG. 4 is a diagram showing an example of the configuration of a network for explanation of the present embodiment.

Referring to FIG. 4, the network is composed of twelve multicast communication devices, which are labeled A, B, C, . . . L, respectively. Further it is assumed that a distance between adjacent nodes is 1.

As shown in FIGS. 5A–5L, the respective distance tables of the multicast communication devices A–L are created. Taking the multicast communication device A as an example, the multicast communication device A itself is at a distance of 0, three multicast communication devices B, C and D are at a distance of 1 from the multicast communication device A, and four multicast communication devices E, F, G and H are at a distance of 2 from the multicast communication device A. In this manner, all the multicast communication devices A–L are arranged according to distance steps 0, 1, 2, . . . , as shown in FIG. 5A. Similarly, the respective distance tables of the multicast communication devices B–L are created as shown in FIGS. 5B–5L. As described later, the multicast communication devices A–L transmit the respective distance tables to each other depending on the distance measurement request/reply packet to store a set of the distance tables.

Operation

The multicast communication device 10 as described above performs the following operations:

Creating and updating the distance table by periodically measuring the distance between the multicast communication device 10 and the other ones;

Multicasting a multicast packet through multicast routes determined depending on the distance information; and Receiving a transmission result of a multicast packet from each destination node.

Creation and Update of Distance Table

Figure 6:
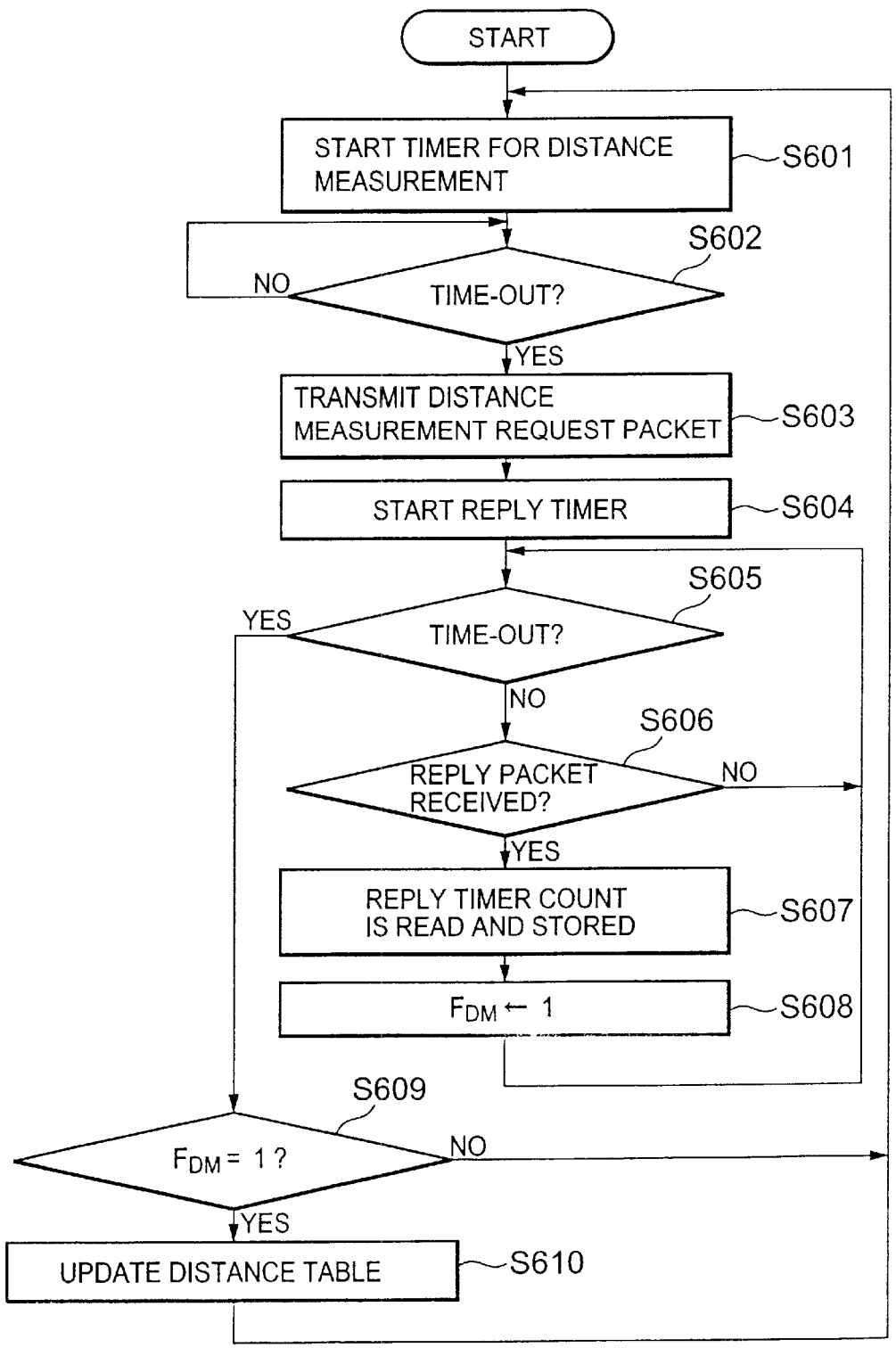
FIG. 6 is a flowchart showing an operation of a distance measurement section in the embodiment.

The distance measurement section 101 measures a distance of each destination node and then creates or updates the distance table 102 as shown in FIG. 6.

Referring to FIG. 6, after initializing variables including a distance measurement variable $F_{DM}$ and starting a distance measurement timer set for a predetermined timeout period (step S601), the distance measurement section 101 determines whether the measurement timer reaches the predetermined timeout period (step S602). The predetermined timeout period is determined depending on the configuration of the network 20 so as not to overload the network 20. In this embodiment, the predetermined timeout period is set to 20 seconds, which is usually employed in an ordinary routing monitor.

When a timeout occurs (YES in step S602), the distance measurement section 101 transmits a distance measurement request packet 60 to all multicast communication devices (step S603) and then starts a reply timer set for a predetermined reply timeout period (step S604). The distance measurement section 101 checks whether a distance measurement reply packet 61 is received until the reply timer reaches the predetermined reply timeout period (step S605 and S606). When a distance measurement reply packet 61 is received from a certain multicast communication device (YES in step S606), the distance measurement section 101 reads a reply timer count of the reply timer at that time and stores the reply timer count as distance information for that multicast communication device (step S607). Thereafter, the distance measurement variable $F_{DM}$ is set to 1 (step S608) and control goes back to the step S605. In this manner, each time a distance measurement reply packet 61 is received from a multicast communication device, the reply timer count at that time is stored as distance information for the multicast communication device which has transmitted the reply packet.

When a timeout occurs (YES in step S605), it is determined whether the distance measurement variable $F_{DM}$ is set to 1 (step S609) and, if $F_{DM}=1$ (YES in step S609), then the distance table 102 is created or updated (step S610). After creating/updating the distance table 102 or if $F_{DM}$ is not equal to 1 (NO in step S609), control goes back to the step S601.

Multicast Route Decision

It is assumed that the destination designation section 108 stores a destination list including a plurality of designated destination addresses and the transmitter 109 stores predetermined transmission data. In other words, the case where the multicast communication device 10 is a multicast source will be described hereinafter.

Figure 7:
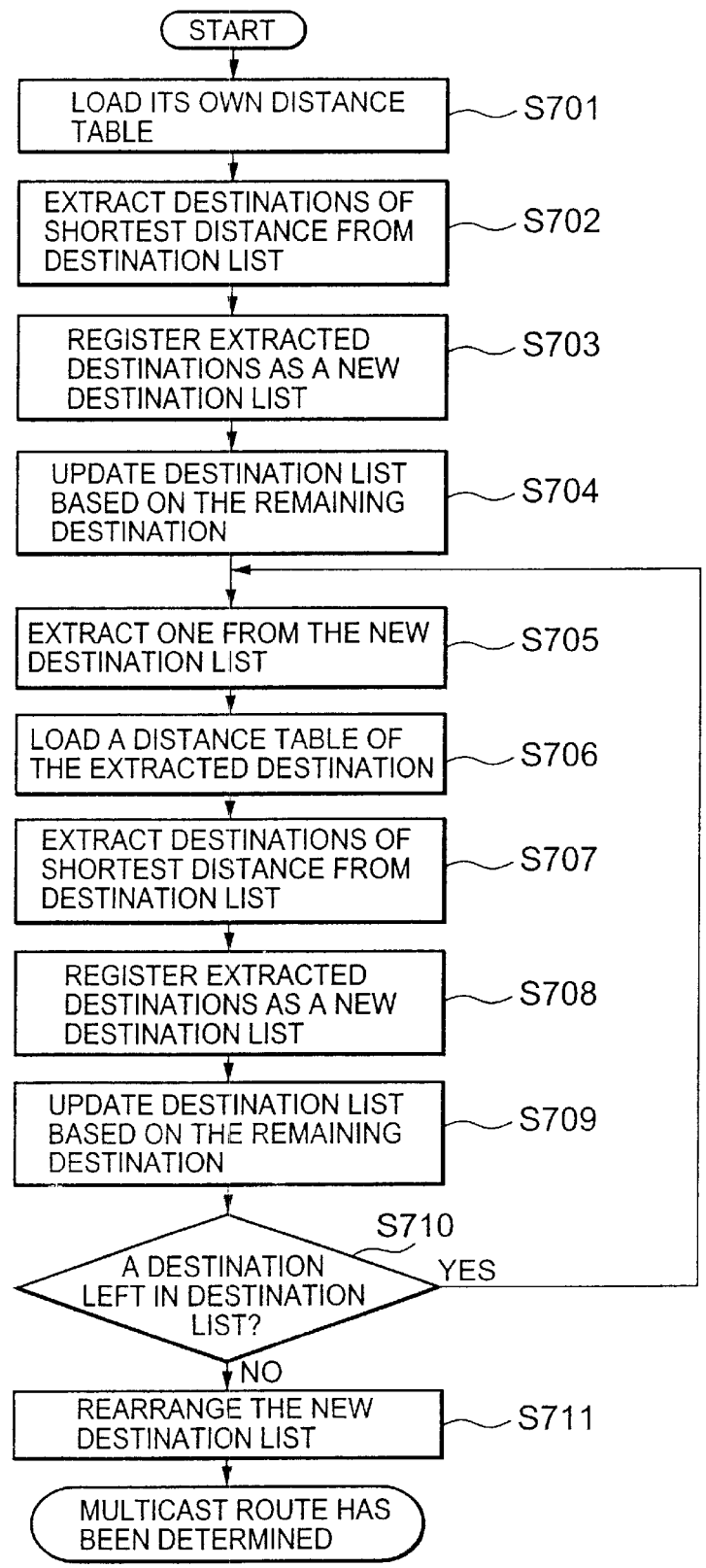
FIG. 7 is a flow chart showing an operation of a destination decision section in the embodiment.

When the destination designation section 108 outputs the stored destination list to the destination decision section 105, the destination decision section 105 determines multicast communication devices to which a multicast packet is to be sent according to the procedure as shown in FIG. 7.

Referring to FIG. 7, the destination decision section 105 loads the distance table of its own from the distance table 102 (step S701). For example, in the case of the multicast communication device A, the distance table shown in FIG. 5A is read from the distance table 102. Subsequently, the destination decision section 105 extracts a destination having the shortest distance from the distance list by referring to the loaded distance table (step S702). If two or more multicast communication devices belong to the shortest distance step of the distance table, then a plurality of destinations may be extracted from the destination-list. The extracted destination is registered on a new destination list (step S703). Therefore, this new destination list contains the destinations to which the multicast communication device 10 directly transmits a multicast packet. Thereafter, the destination list is updated to contain the remaining destinations only (step S704). This updated destination list is used as a destination list for the downstream multicast communication devices.

Subsequently, the destination decision section 105 distributes the remaining destinations of the updated destination list among the destinations registered in the new destination list according to the following steps S705–S711. In other words, the remaining destinations downstream from the extracted destinations are grouped under the extracted destinations.

More specifically, the destination decision section 105 extracts a single destination from the new destination list (step S705) and then loads the distance table of the extracted single destination from the distance table 102 (step S706). For example, in the case of the multicast communication device B, the distance table shown in FIG. 5B is read from the distance table 102. Subsequently, the destination decision section 105 extracts a destination having the shortest distance from the updated destination list by referring to the loaded distance table (step S707). If two or more multicast communication devices belong to the shortest distance step of the distance table, then a plurality of destinations may be extracted from the destination list. The extracted destination is registered on a new destination list to form a group of the extracted single destination (step S708). Therefore, this new destination list at this stage contains the destinations to which the multicast communication device of the extracted single destination directly transmits a multicast packet. Thereafter, the updated destination list is further updated to contain the remaining destinations only (step S709). The steps S705–S709 are repeatedly performed until all the destinations of the destination list have been grouped (step S710).

After all the destinations of the destination list have been grouped, the resultant new destination list is rearranged to make the number of grouped destinations uniform (step S711). More specifically, the multicast route generated by the steps S705–S710 is not uniform. Therefore, it is preferably that the destinations having the same distance are dispersed. To make the number of grouped destinations uniform, the destination decision section 105 compares the grouped multicast destinations among the groups.

In this manner, multicast routes are generated in form of grouped destination list. The destination decision section 105 outputs the multicast routes to the destination adder 106.

Figures 8A, 8B, 9:
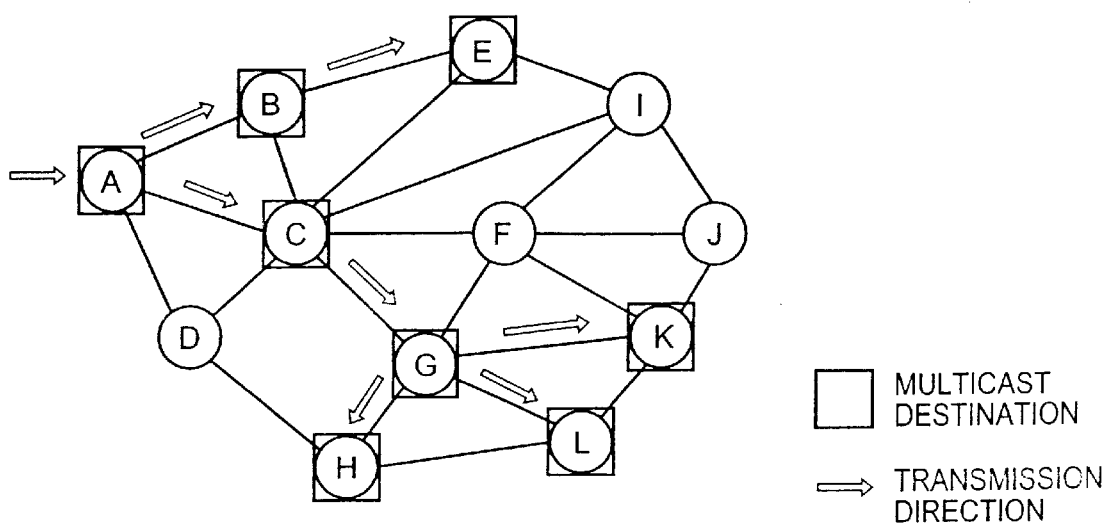
FIG. 8A is a diagram showing a destination list formed by a destination designation section in the embodiment.
FIG. 8B is a diagram showing a destination list formed by the destination decision section in the embodiment.
FIG. 9 is a diagram showing an example of a determined multicast route according to the present embodiment.

As shown in FIG. 8A, it is assumed that the destination list is generated by the destination designation section 108. In this case, the designation decision section 105 creates the new destination list as shown in FIG. 8B. In the new destination list, the respective multicast routes are represented by chains of destinations grouped under the directly connected multicast communication devices (here A, B, and G).

The destination adder 106, when inputting the transmission data from the transmitter 109, adds the grouped destination list to the transmission data, and then transmits the assembled multicast packet to the destinations having the shortest distance through the network 20.

Next, an operation of the multicast communication system will be concretely described in the case of the network as shown in FIG. 4.

EXAMPLE-1

As shown in FIG. 9, it is assumed that a multicast communication device A is a source, multicast communication devices B, C, E, G, H, K, and L are multicast destinations, and the multicast communication device A stores the distance tables of the multicast communication devices A–L as shown in FIGS. 5A–5L.

First, when a multicast request having the multicast destinations B, C, E, G, H, K, and L occurs, the multicast communication device A refers to the distance table of its own and selects the destinations B and C having the shortest distance from the destinations B, C, E, G, H, K, and L. Therefore, the multicast communication device A determines to multicast a multicast packet to the selected destinations B and C.

Thereafter, the multicast communication device A groups the remaining destinations E, G, H, K, and L under the selected destinations B and C. First, the multicast communication device A refers to the distance table of the multicast communication device B and selects the destination E having the shortest distance from the remaining destinations E, G, H, K, and L. Subsequently, the multicast communication device A refers to the distance table of the multicast communication device C and selects the destination G having the shortest distance from the remaining destinations G, H, K, and L. Similarly, the multicast communication device A refers to the distance table of the multicast communication device G and selects the destination H, K, and L having the shortest distance from the remaining destinations H, K, and L. In this way, the multicast routes are generated as follows (see FIG. 9):

a) A→B→E;
b) A→C→G→H;
c) A→C→G→K; and
d) A→C→G→L.

It should be noted that only two routes, A→B and A→C, are determined at this stage and the following routes to E, G, H, K and L are not determined but generated by grouping under B and C. For example, G, H, K and L are grouped under C to generate multicast routes b), c) and d) at the multicast communication device A. However, the multicast communication device C independently determines the multicast routes to G, H, K, and L based on the destination list received from the multicast communication device A according to the above-mentioned procedure as shown in FIG. 7. Normally, the routes b), c) and d) which have been generated by the multicast communication device A may be selected at the multicast communication device C. In the case of occurrence of a failure between G and L, for example, the route is changed from G→L to G→K→L or G→H→L and therefore the distance between G and L is changed to "2". Since the distance between G and L has been changed, the distance tables are updated according to the procedure as shown in FIG. 6.

EXAMPLE-2

Figure 10:
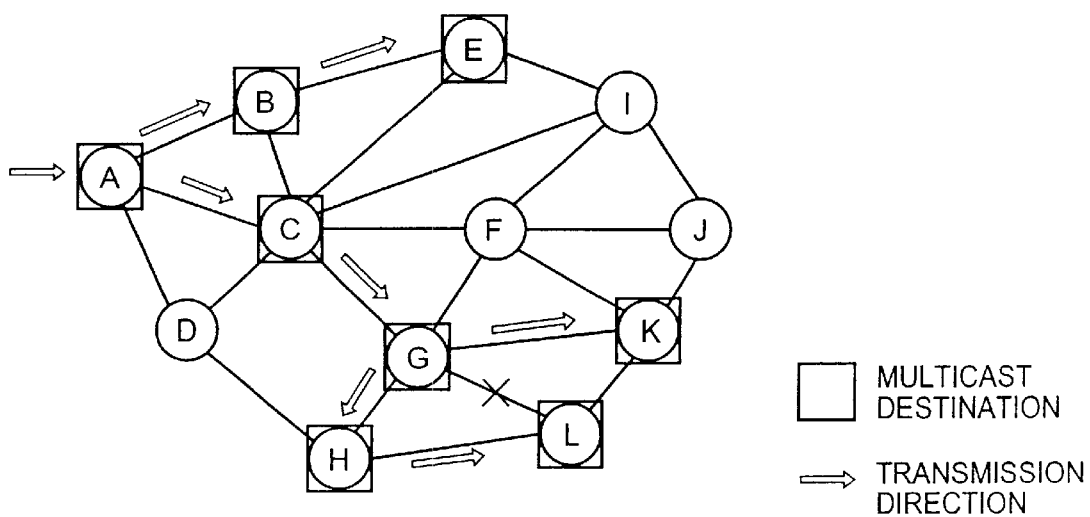
FIG. 10 is a diagram showing an example of a changed multicast route in the case of occurrence of a failure according to the present embodiment.

As shown in FIG. 10, consider the case where a failure occurs between the multicast communication devices G and L. In this case, the multicast communication device C, when receiving a multicast packet from the multicast communication device A, refers to the distance table of its own and selects the destination G having the shortest distance from the destinations G, H, K, and L conveyed by the received multicast packet. Further, the multicast communication device C refers to the distance table of the multicast communication device G and selects the destinations H and K having the shortest distance from the destinations H, K, and L, and then selects the destination L by referring to the distance table of the multicast communication device H. In this way, the multicast routes determined by the multicast communication device C are generated as follows (see FIG. 10):

e) C→G→H→L; and
f) C→G→K.

It is the same with the multicast communication device G which has received the multicast packet from the multicast communication device C. That is, the multicast communication device G independently determines the multicast routes to H, K and L as described above.

In the case where the multicast communication devices H and K are selected from the multicast communication devices H, K, and L before the multicast communication device L is selected by referring to the distance table of the multicast communication device K, the multicast routes are generated as follows:

g) C→G→H; and
h) C→G→K→L.

In this case, it is necessary to select one of a set of multicast routes e) and f) and a set of multicast routes g) and h) in the course of grouping.

EXAMPLE-3

After the multicast communication device A determines the multicast routes A→B and A→C, the respective groups of the multicast communication devices B and C are produced as mentioned above. In the grouping process, if the grouping of the multicast communication device C is performed before that of the multicast communication device B, then the multicast communication device E belongs to the group of the grouping of the multicast communication device C.

Figure 11:
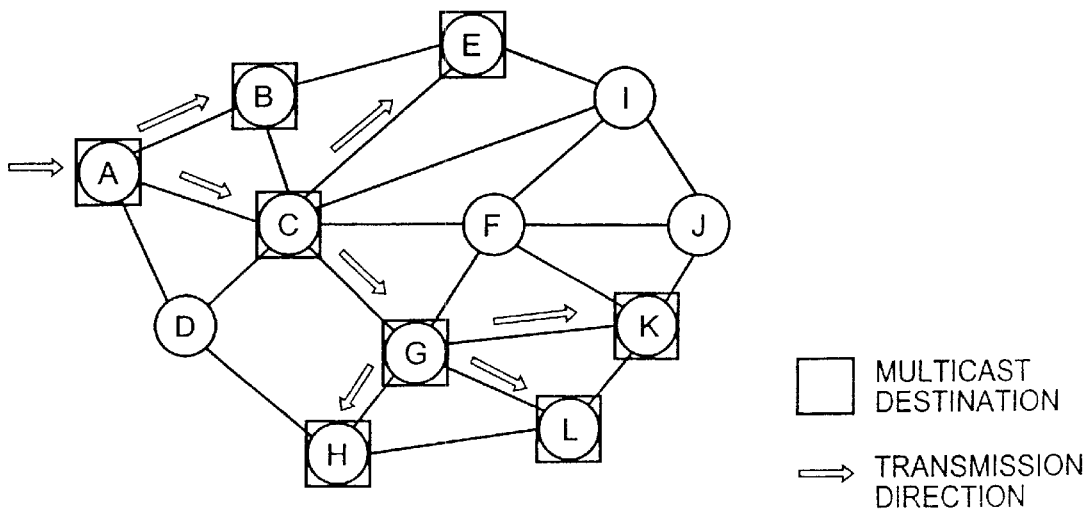
FIG. 11 is a diagram showing another example of a determined multicast route according to the present embodiment.

As shown in FIG. 11, therefore, the multicast routes are generated as follow:

i) A→C→E;
j) A→C→G→H;
k) A→C→G→K;
l) A→C→G→L; and
m) A→B.

It should be noted again that only multicast routes, A→B and A→C, are determined at this stage and the following routes to E, G, H, K and L are not determined but generated by grouping under B and C. The respective multicast communication devices downstream from the multicast communication device A independently determine the remaining multicast routes in the groups.

Example of Packet Setting

An example of packet setting will be described hereinafter in the case where packets flow through the network as shown in FIG. 9.

In the multicast communication device A, the header 51 of a packet 50 addressed to B is set as follows:

(1) Destination address is set to B;
(2) Source address is set to A;
(3) Multicast destination list 53 is set to E;
(4) Destination list 55 is set to B, C, G, H, K, and L;
(5) Reply route 54 is set to A.

On the other hand, the header 51 of a packet 50 addressed to C is set as follows:

(1) Destination address is set to C;
(2) Source address is set to A;
(3) Multicast destination list 53 is set to G, H, K, and L;
(4) Destination list 55 is set to B, C, G, H, K, and L;
(5) Reply route 54 is set to A.

In the multicast communication device B which has received the multicast packet 50 from the multicast communication device A, first and second packets 50 are produced and transmitted. The first packet 50 is set as follows: (1) Destination address is set to E; (2) Source address is set to B; and (3) Multicast destination list 53 is set to blank. The second packet 50 is set as follows: (1) Destination address is set to A; (2) Source address is set to B; (4) Destination list 55 has B marked; and the data is deleted.

In the multicast communication device E which has received the multicast packet 50 from the multicast communication device B, a packet 50 is produced and transmitted, which is set as follows: (1) Destination address is set to B; (2) Source address is set to E; and (4) Destination list 55 has E marked; and the data is deleted.

In the multicast communication device C which has received the multicast packet 50 from the multicast communication device A, first and second packets 50 are produced and transmitted. The first packet 50 is set as follows: (1) Destination address is set to G; (2) Source address is set to C; and (3) Multicast destination list 53 is set to H, K, and L. The second packet is set as follows: (1) Destination address is set to A; (2) Source address is set to C; (4) Destination list 55 has C marked; and the data is deleted.

In the multicast communication device G which has received the multicast packet 50 from the multicast communication device C, first, second, third and fourth packets 50 are produced and transmitted. The first packet 50 is set as follows: (1) Destination address is set to H; (2) Source address is set to G; and (3) Multicast destination list 53 is set to blank. The second packet is set as follows: (1) Destination address is set to K; (2) Source address is set to G; and (3) Multicast destination list 53 is set to blank. The third packet is set as follows: (1) Destination address is set to L; (2) Source address is set to G; and (3) Multicast destination list 53 is set to blank. The fourth packet is set as follows: (1) Destination address is set to C; (2) Source address is set to G; (4) Destination list 55 has G marked; and the data is deleted.

In the multicast communication devices H, K, and L which have received the multicast packet 50 from the multicast communication device G, each of the multicast communication devices H, K, and L produces and transmits a packet, which is set as follows: (1) Destination address is set to G; (2) Source address is set to H, K, and L; (4) Destination list 55 has its own address marked; and the data is deleted.

Completion of Packet Transmission

When each multicast communication device has received the multicast packet addressed thereto, an acknowledgement packet having no data is sent back to the source. When receiving the acknowledgement packet having no data, each multicast communication device reads the Reply route 54 of its header and transmits the received acknowledgement packet to the source.

Figure 12:
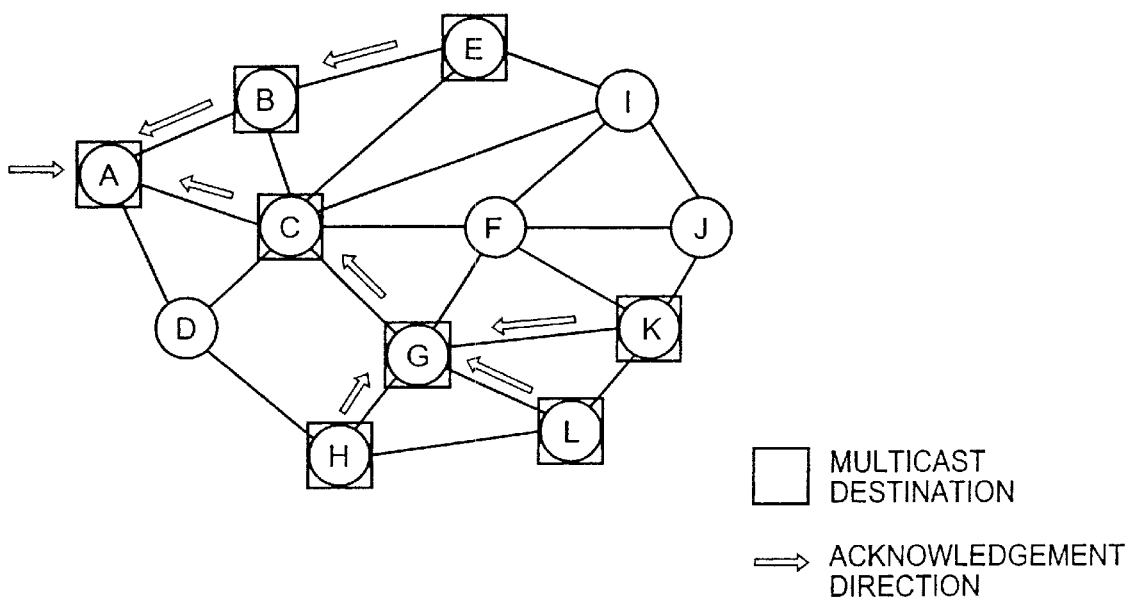
FIG. 12 is a diagram showing a replay route in the case where a multicast route is determined according to the present embodiment.

As shown in FIG. 12, the acknowledgement packet is sent from each of the destinations back to the multicast communication device A. When receiving an acknowledgement packet from a destination, the multicast communication device A is informed of completion of packet transmission to that destination.

What is claimed is:

1. A multicast communication method between a source node and a plurality of destination nodes through at least one of said nodes in a multicast communication network, comprising the steps of:

at each of the nodes:
(a) storing a table including distances between each of the nodes and the other nodes;
(b) upon receiving a destination list, sequentially selecting from the destination list a node having a shortest distance by referring to the table to generate a multicast route;
(c) performing communication through the multicast route wherein the table in step a) is updated by the steps of:
transmitting a distance measurement request to the other nodes in the multicast communication network at predetermined intervals;
measuring response time required from transmission of the distance measurement request to reception of a distance measurement reply for each of the other nodes; and
updating the table using the response time.

2. The method according to claim 1, wherein the table comprises distance tables containing distance information for one or more respective nodes.

3. The method according to claim 2, wherein the step b) comprises the steps of:

b-1) selecting from the destination list at least one first node having a shortest distance by referring to the distance table of the node to produce a new destination list;

b-2) grouping the nodes that are not included in the new destination list under each first node of the new destination list; and b-3) transmitting a group of nodes for each first node as a destination list.

4. The method according to claim 3, wherein the step b-2) comprises the steps of:

b-2.1) sequentially selecting a single node from the new destination list; and b-2.2) sequentially selecting at least one second node having a shortest distance from the nodes other than the new destination list by referring to a distance table of the single node selected to produce a group of nodes for the single node selected.

5. The method according to claim 4, further comprising the step of:

b-2.3) rearranging groups corresponding to nodes included in the new destination list such that a number of nodes for each group is made uniform.

6. The method according to claim 1, further comprising the steps of:

d) when receiving multicast information addressed thereto, transmitting an acknowledgement thereof back to the source node.

7. A multicast communication method between a source node and a plurality of destination nodes through at least one of said nodes in a multicast communication network, comprising the steps of:

at each of the nodes:
(a) storing a table including distances between each of the nodes and the other nodes;
(b) upon receiving a destination list, sequentially selecting from the destination list a node having a shortest distance by referring to the table to generate a multicast route;
(c) performing communication through the multicast route
wherein the table in step a) is updated by the steps of:
transmitting a distance measurement request to the other nodes in the multicast communication network at predetermined intervals;
measuring response time required from transmission of the distance measurement request to reception of a distance measurement reply for each of the other nodes; and
updating the table using the response time wherein the distance measurement reply conveys distance information of the corresponding node.

* * * * *